United States Patent [19]

Buennagel et al.

[11] 4,352,992
[45] Oct. 5, 1982

[54] APPARATUS FOR ADDRESSABLY CONTROLLING REMOTE UNITS

[75] Inventors: James A. Buennagel, Indianapolis, Ind.; Richard C. Koch, Cherry Hills Village, Colo.

[73] Assignee: Regency Electronics, Inc., Indianapolis, Ind.

[21] Appl. No.: 125,285

[22] Filed: Feb. 27, 1980

[51] Int. Cl.³ ............................................. G01R 21/00
[52] U.S. Cl. ........................................ 307/40; 375/48;
375/89; 340/825.06
[58] Field of Search .................. 307/40; 329/110, 126;
364/493; 332/1; 340/310 R, 310 A, 151, 695,
171 R, 171 PF, 696, 825.06, 825.58, 825.73,
825.75; 375/45, 48, 89

[56] References Cited
U.S. PATENT DOCUMENTS
4,213,182 7/1980 Eichelberger et al. ............. 364/493

Primary Examiner—G. Z. Rubinson
Assistant Examiner—James L. Dwyer
Attorney, Agent, or Firm—Woodard, Weikart, Emhardt & Naughton

[57] ABSTRACT

A load management system which includes a central message generator and a plurality of addressable remote load controllers which selectively connect and disconnect high power deferrable loads to and from a power source in response to transmitted messages. The load controllers include means for translating coded tone pair inputs into digital data. Tones selected from three such tone pairs are used in one scheme, where a tone selected from the first tone pair is used for the initial bit of a message, and subsequent tones are alternately selected from the remaining two tone pairs or the remaining bits. One of the tones of the first tone pair is utilized as a test tone which initiates a test routine sequence. The test tone can be transmitted by a portable, low power transmitter to test the functioning of the remote units. A message format includes two code sets, a zone code set and a command/address code set. Each load controller has a preprogrammed zone identifier and a preprogrammed address identifier, and is responsive to a command/address code message only when the last received zone code message has identified the preprogrammed zone identifier of that load controller and the command/address message indicates the preprogrammed address identifier of that load controller. All load controllers having a common zone identifier are responsive to a scram instruction message which identifies that zone.

38 Claims, 15 Drawing Figures

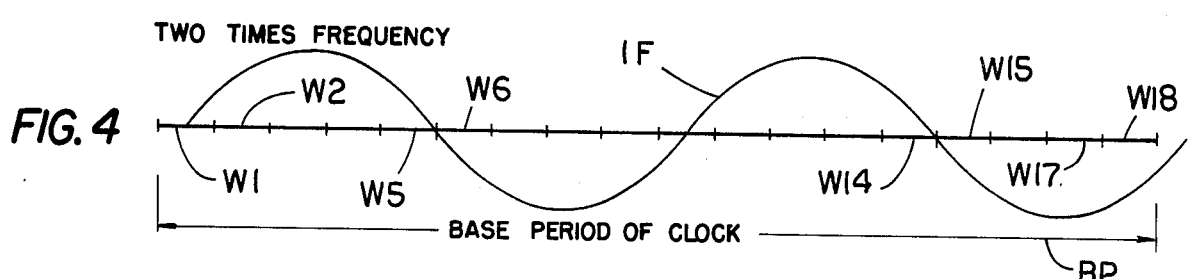
FIG. 4
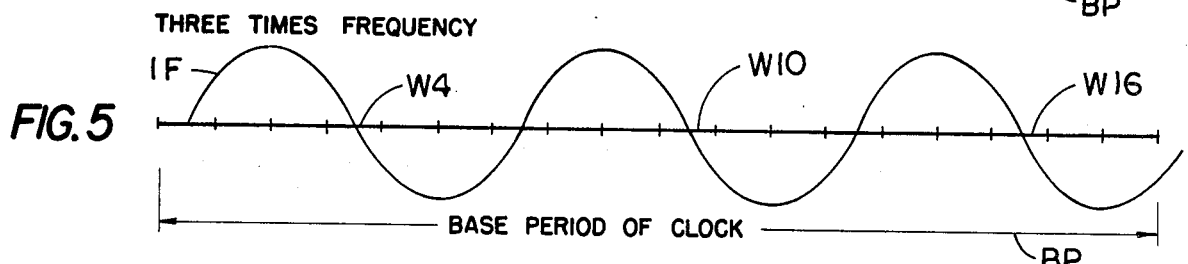
FIG. 5
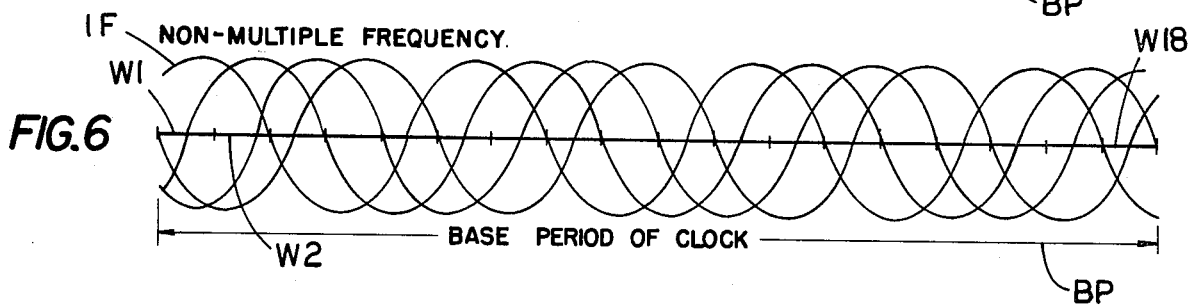
FIG. 6
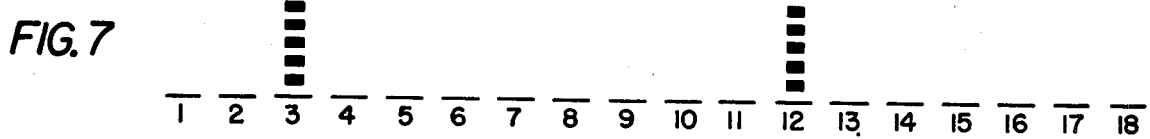
FIG. 7
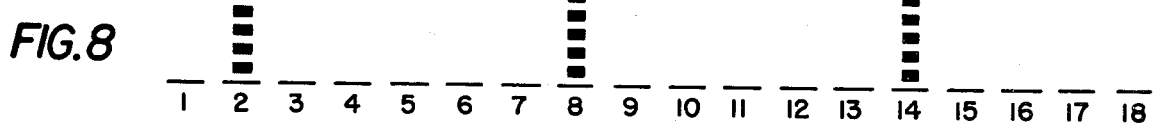
FIG. 8
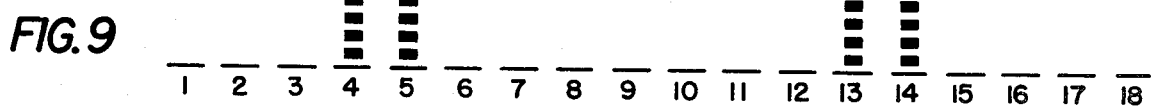
FIG. 9
FIG. 10
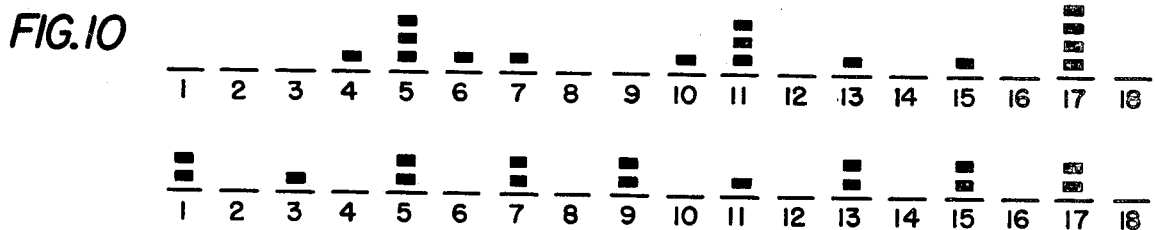
FIG. 11

APPARATUS FOR ADDRESSABLY CONTROLLING REMOTE UNITS

BACKGROUND OF THE INVENTION

1. Field of the Invention

The field of the invention relates to apparatus for addressably controlling remote units. The preferred embodiment is an apparatus which is useful in an electric power company load management system which includes a central message generator, and a plurality of addressable load controllers which selectively connect and disconnect high power deferrable loads to and from a power source in response to transmitted messages.

2. Description of the Prior Art

The power systems of electric power companies regularly encounter periods of peak load demand. During these periods the power drain placed upon the power system is significantly higher than average. The peak load periods vary according to the time of day and the seasons of the year. It is excessively costly to maintain the supply of power during these peak load periods, but if the power demand is not met the result can be power failure or blackout.

In a load management system, the power supply and demand are monitored, and certain high power deferrable loads, such as water heaters and air conditioners, are selectively turned off to evenly distribute the power demand over time, thereby alleviating peak load periods. The result is a more efficient and less costly power system. It is also desirable for a load management system to be able to scram, or disconnect, a large number of deferrable loads in a short period of time to avoid the occurrence of a blackout.

Apparatus for addressably controlling remote units have been used in other fields, such as for telephone paging, burgular alarm systems, remote control for repeater systems, etc. However, these units operate with schemes which often require relatively long message times, or expensive receiving equipment, or a small number of addressable units. Moreover, many of these systems have a significant problem with noise interference.

SUMMARY OF THE INVENTION

To obtain an accurate understanding of the scope of the invention, reference should be made to the claims of this application. In certain embodiments, there is a load management system which includes a central message generator and a plurality of addressable remote load controllers which selectively connect and disconnect high powr deferrable loads to and from a power source in response to transmitted messages. The load controllers include means for translating coded tone input into digital data. Three tone pairs are used in one scheme, where a first tone pair is used for the initial bit of a message, and the remaining two tone pairs alternate for the remaining bits. One of the tones of the first tone pair is utilized as a test tone which initiates a test routine sequence. The test tone can be transmitted by a portable, low power transmitter to test the functioning of the remote units. A message format includes two code sets, a zone code set and a command/address code set. Each load controller has a preprogrammed zone identifier and a preprogrammed address identifier, and is responsive to a command/address code message only when the last received zone code message has identified the preprogrammed zone identifier of that load controller and the command/address message indicates the preprogrammed address identifier of that load controller. All load controllers having a common zone identifier are responsive to a scram instruction message which identifies that zone.

BRIEF DESCRIPTION OF THE DRAWINGS

FIGS. 4, 5 and 6 are graphs, illustrating a base period of a window input sequencer 25 of FIG. 3, the base period being divided up into eighteen time windows. FIG. 4 shows a phase relationship of an input frequency with respect to the base period and the eighteen time windows, where the input frequency has a period which is one-half of the base period of the window input sequencer (twice the frequency). FIG. 5 illustrates the phase relationship where the input frequency has three times the frequency of the window input sequencer. FIG. 6 illustrates the phase relationship of a non-multiple frequency.

FIGS. 7, 8, 9, 10 and 11 are graphical illustrations of examples of tones and derived digital data which may be accumulated in windows 1–18 of FIG. 3. FIG. 7 illustrates the accumulated data for a tone which has a base period which is one-half the base period of the window input sequencer (twice the frequency). FIG. 8 illustrates the digital data accumulated where the input frequency is three times the frequency of the window input sequencer. FIG. 9 is an example of a double frequency where there is a crossover point which is at the threshold between two windows. FIG. 10 illustrates a triple frequency input with outside noise interference. FIG. 11 is illustrative of the digital data accumulated where the input frequency is not one of the frequencies which are being searched for.

DESCRIPTION OF THE PREFERRED EMBODIMENT

Figure 1:
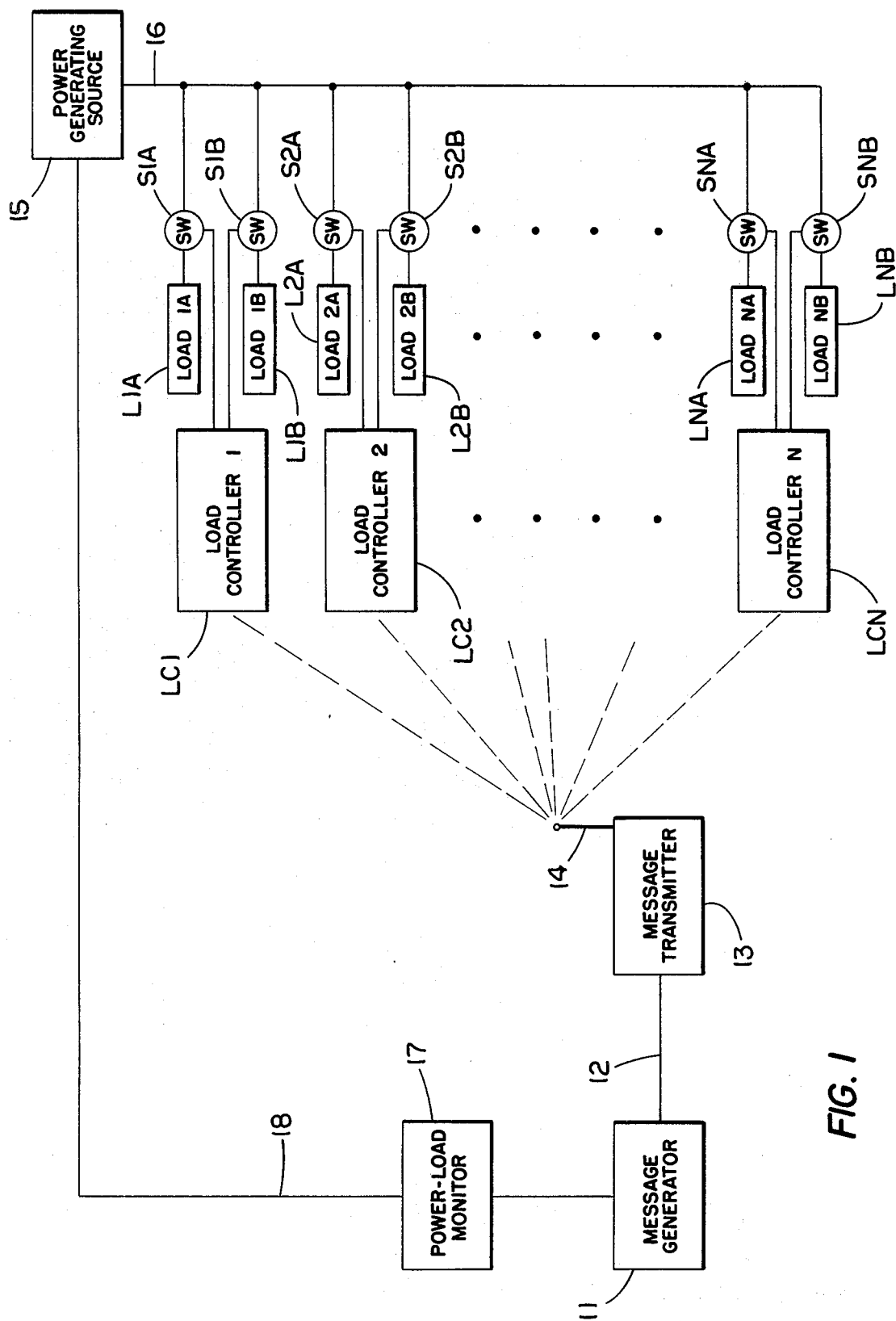
FIG. 1 is a schematic diagram of a load management system embodying the present invention.

FIG. 1 is a schematic illustration of a load management system embodying the present invention. Such a system functions to selectively control the load for a power system, such as for an electric power company system of a metropolitan area. By selectively controlling the loads, such a load management system can prevent and diminish the occurrences of peak load demands which are both costly and a potential cause of blackouts. The power system includes a power generating souce 15, connected to a series of loads L1A, L1B, L2A, L2B, . . . LNA and LNB through power distribution lines 16. A power load monitor 17 monitors the power supply by power generating source 15 and the load demand of loads L1A through LNB through line 18. Message generator 11 is responsive to power load monitor 17. During various power-load conditions message generator 11 transmits messages to control the overall load which is being placed upon the power generating source 15. Such messages are transmitted through telephone transmission line 12. Effective transmission over telephone lines is restricted to tone frequencies between 400 Hz and 1300 Hz. Messages generated by message generator 11 are received by message transmitter 13 through telephone line 12. Message transmitter 13 transmits the message on an FM frequency. These messages are transmitted from antenna 14 and are received by each of the load controllers LC1 through LCN. In response to appropriate received messages, a load controller, such as load controller LC1, selectively connects and disconnects loads L1A and L1B to and from power generating souce 15 through switch means S1A and S1B respectively.

Figure 2:
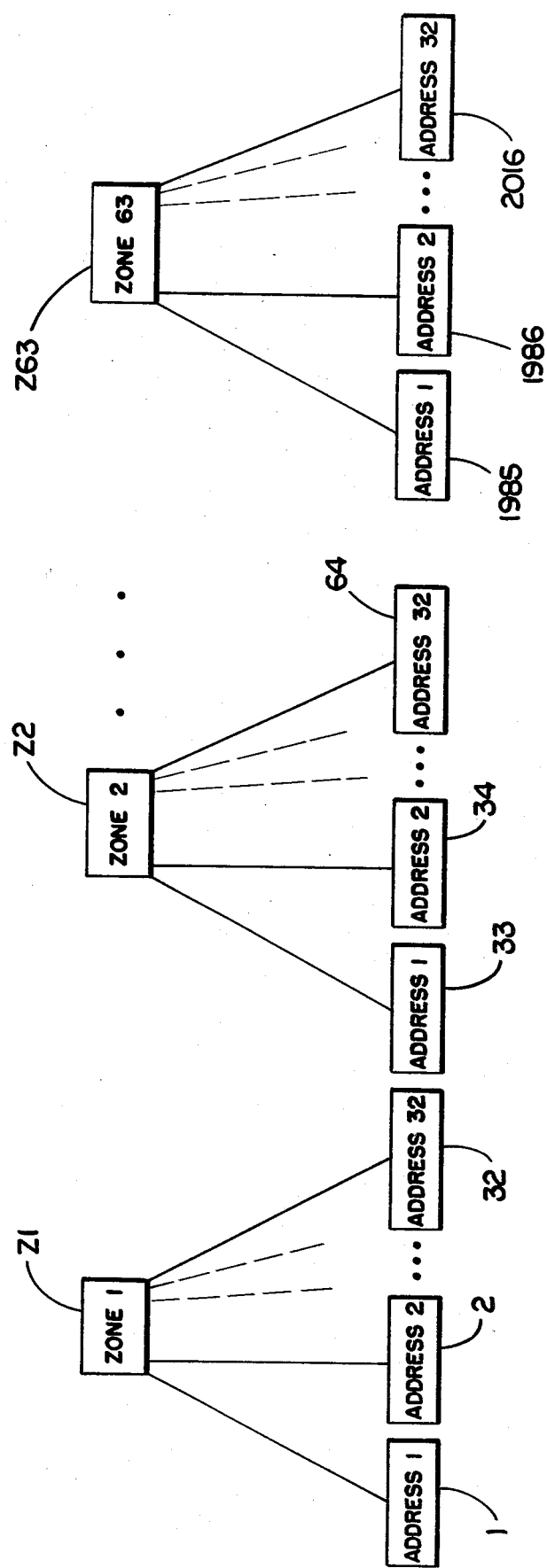
FIG. 2 is a schematic representation of the addressing system of the load controllers of FIG. 1.

Each of the load controllers is responsive to appropriate messages only when an appropriate identification has also been transmitted. FIG. 2 is illustrative of the identification scheme which is used in the preferred embodiment. Each load controller has two preprogrammable identification numbers. The first identification number is a zone identifier which is a six bit binary number. One of the zone identifier numbers is not used for identification purposes, but rather is used to disable future messages. Therefore there are sixty-three zone identification numbers which are available, enabling the power system to be broken down into up to sixty-three zones, such as zone Z1, zone Z2 ... zone Z63.

The address identifier is a five bit binary number, thereby allowing up to thirty-two addresses within each zone. Utilizing the full available sixty-three zones, and all available addresses, a power system can have as many as two thousand sixteen individual unique identification numbers for the load controllers. In a further expanded system, a number of load controllers can each have the same zone and address identification. Such an expanded system would be most effective where the load controllers are evenly divided between the number of available zones, and between the number of available addresses within each zone.

Figure 3:
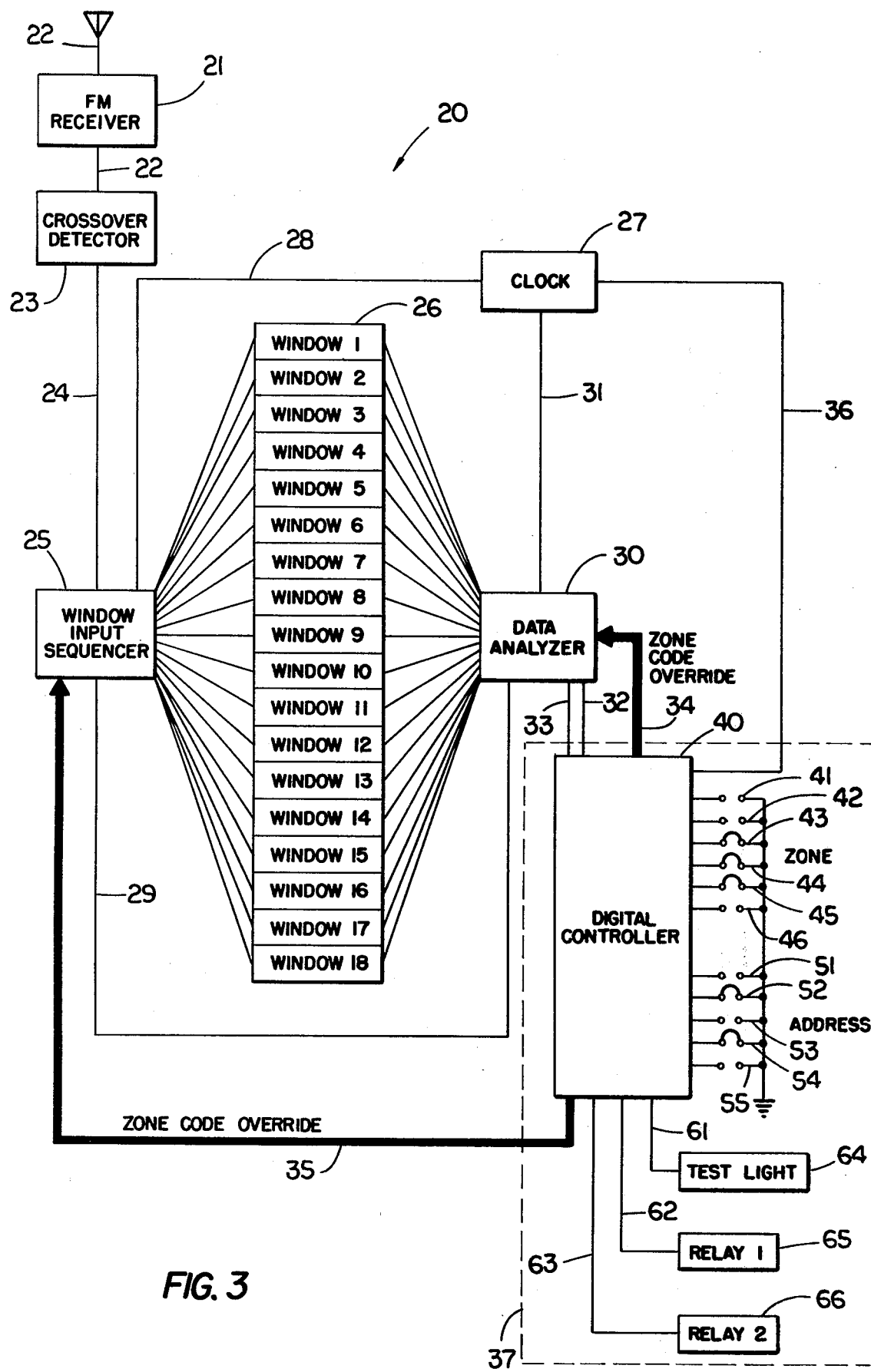
FIG. 3 is a schematic diagram of a load controller of FIG. 1.

FIG. 3 schematically illustrates a load controller 20 of FIG. 1. FM receiver 21 receives radio frequency transmissions from message transmitter 13 through antenna 22. The output of FM receiver 21 are the audio tone signals which were initially generated by message generator 11. This output is transmitted through line 22 to crossover detector 23. The function of crossover detector 23 is to generate an output in response to the detection of a particular phase in the cycle of the incoming tone through line 22. In the preferred embodiment, the phase of the cycle that is detected is the crossover point from a positive state to a negative state in the cycle. Alternatively, both positive to negative and negative to positive may be searched. As an additional alternative, positive and/or negative peaks may be sensed. These alternatives, however, add to the complexity of the crossover detector.

Window input sequencer 25 repetitively and sequentially applies the output (line 24) of crossover detector 23 to WINDOW 1 (W1) through WINDOW 18 (W18) in data accumulator 26. Included in window input sequencer 25 is means for determining the number of windows which are to be sequenced, and means for determining the time length duration of each window. Window input sequencer 25 possesses the capability of making time length determinations by being connected to clock 27 (line 28). By so selecting the number of windows to be sequenced and the time length of each window, window input sequencer 25 determines a base period or cycle length (and its associated repetition frequency). When referred to at later times in this application, such a base period shall mean the length of time required for window input sequencer 25 to cycle through one complete cycle of sequenced windows.

The accumulated data in data accumulator 26 is analyzed by data analyzer 30. The specific data analysis which is performed by data analyzer 30 will be discussed in detail later in this specification. Generally, data analyzer 30 examines the accumulated data in data accumulator 26 for appropriate repetitious occurrences in the windows, WINDOW 1 through WINDOW 18, to determine whether one of two searched-for tones has been received by FM receiver 21. This analysis is initialized when window input sequencer has received an appropriate amount of data (line 29). When one of the two searched for tones has been found, data analyzer 30 transmits a digital bit to digital controller 40. A bit may consist of either a logic high (line 33) or a logic low (line 32). Digital analyzer 30 then reinitializes window input sequencer 25 for the collection of data for the next sequential bit in a message. Data analyzer 30 is also time sensitive, being connected to clock 27 (line 31). If no appropriate search for a tone is detected within a specific period of time, data analyzer 30 signals window input sequencer 25 to be reinitialized to gather data relating to searching for an initializing bit (line 29).

Digital controller 40 includes means for decoding digital messages and for responding to appropriate message transmissions. Digital controller 40 includes a preprogrammable six bit zone identifier, which consists of jumper wire connections 41 through 46, and also includes a preprogrammable five bit address identifier, which consists of jumper wire connections 51 through 55. These jumper wire connections may be readily manually disconnected or reconnected by an operator. Digital controller 40 is also time sensitive, being connected to clock 27 (line 36). In response to appropriate message transmissions, digital controller 40 has the capacity to selectively control the opening and closing of relay 1 (65) and relay 2 (66) through lines 62 and 63, respectively. In response to an appropriate test signal, digital controller 40 also has the capability of turning on test light 64 (line 61) when a test routine has indicated that the system is working properly. The internal functioning of digital controller 40 is disclosed in more precise detail in FIG. 12, and will be discussed in a later portion of this application.

FIGS. 4, 5 and 6 illustrate the general means by which detection of one of two tones is accomplished. Each of these figures show a base period BP for the window input sequencer (25) of FIG. 3. Base period BP is divided into eighteen time sequential windows, W1 through W18. FIG. 4 illustrates the wave pattern of an input frequency of a tone which has a period which is one-half the base period BP of the window input sequencer (twice the frequency). The wave of this input tone repetitively forms the same pattern for each time window of the base period. The crossover point from positive to negative for each cycle occurs at the threshold between windows W5 and W6, and at the threshold between windows W14 and W15 during each cycle of the window input sequencer.

FIG. 5 illustrates the resulting wave form of a triple frequency input. The crossover point for such a tone repetitively occurs at windows W4, W10, and W16. FIG. 6 illustrates a non-multiple frequency. The crossover points for such a frequency tend to occur with an even distribution over all of the windows W1 through W18.

During the specific tone detection procedure in the preferred embodiment, window input sequencer 25 inputs 16 detections by crossover detector 23 into data accumulator 26. FIGS. 7-11 illustrate various examples of data inputs which may be accumulated by data accumulator 26 during this period. In each of FIGS. 7-11, the numbers from left to right represent each of the eighteen windows W1-W18 in data accumulator 26. The boxes above each number indicate data inputs, and represent the crossover points from a positive state to a negative state which have been detected by crossover detector 23. In the preferred embodiment, sixteen such data inputs are accumulated before the data is analyzed by data analyzer 30.

FIG. 7 is an example of a double frequency input data (frequency of the input tone is twice the frequency of the window input sequencer 25). These sixteen bits of input are evenly divided between windows three and 12, with eight bits being in window three and eight bits being in window 12. FIG. 8 is an example of a triple frequency input. There are six bits in window 2, and five bits each in windows 8 and 14. FIG. 11 illustrates the relative even distribution which occurs when a non-multiple frequency input is received.

By checking for repetition occurring in each ninth window, or occurring in each sixth window, data analyzer 30 can determine the existence of a double frequency input or the existence of a triple frequency input respectively. This repetition can be detected by accumulating the number of bits in each ninth window, and in each sixth window respectively. Chart 1 is an example of repetition detection of the double frequency input of FIG. 7.

CHART 1

| Window Combination | Data Accumulation |
| --- | --- |
| 1 and 10 | 0 |
| 2 and 11 | 0 |
| 3 and 12 | 16 |
| 4 and 13 | 0 |
| 5 and 14 | 0 |
| 6 and 15 | 0 |
| 7 and 16 | 0 |
| 8 and 17 | 0 |
| 9 and 18 | 0 |

The existence of all sixteen bits in windows three and twelve indicates the presence of a double frequency. After this detection of a search for a frequency, data analyzer 30 transmits the appropriate logic signal to digital controller 40. Chart 2 illustrates the data analysis detection of the triple frequency input of FIG. 8.

CHART 2

| Window Combination | Data Accumulation |
| --- | --- |
| 1, 7 and 13 | 0 |
| 2, 8 and 14 | 16 |
| 3, 9 and 15 | 0 |
| 4, 10 and 16 | 0 |

CHART 2-continued

| Window Combination | Data Accumulation |
| --- | --- |
| 5, 11 and 17 | 0 |
| 6, 12 and 18 | 0 |

There is a possibility that the input frequency may be in a phase relationship with respect to the cycle of the window input sequencer 25 such that the crossover point from a positive state to a negative state occurs at the threshold between adjacent windows. When this occurs, the data input may be distributed between adjacent windows. To detect double and triple frequencies when this type of event occurs, the data analyzer 30 of the preferred embodiment checks for repetition occurrences which include the checking of adjacent windows. The following chart 3 illustrates the window combinations which are checked by data analyzer 30, and also illustrates the results which would occur for a double frequency detection with the data input of FIG. 9. FIG. 9 illustrates the data input of a double frequency tone where the crossover point occurs at a threshold between windows 4 and 5, and windows 13 and 14.

CHART 3

| Window Combination | Data Accumulation |
| --- | --- |
| 1, 2, 9 and 10 | 0 |
| 2, 3, 10 and 11 | 0 |
| 3, 4, 12 and 13 | 8 |
| 4, 5, 13 and 14 | 16 |
| 5, 6, 14 and 15 | 8 |
| 6, 7, 15 and 16 | 0 |
| 7, 8, 16 and 17 | 0 |
| 8, 9, 17 and 18 | 0 |
| 9, 10, 18 and 1 | 0 |

Owing to radio interference and other signal distorting causes such as noise, sometimes the input signal may not be precisely received by FM receiver 21. To account for this, and to allow for detection of a bandwidth of frequencies, the data analyzer 30 of the preferred embodiment does not require that all sixteen bits be found in the appropriate windows. It has been found that for the frequencies which are used in the preferred embodiment, that the detection of eleven or more bits in an appropriate window combination is indicative of a searched for tone. This represents slightly more than 65% of the theoretical number of 16 bits which should be in the appropriate windows. It is desirable for a practical system that this percentage be at least as low as 90% but not as low as 50%. Chart 4 illustrates a triple frequency input detection of data input illustrated in FIG. 10. This data input includes various erroneous signals, yet the appropriate triple frequency signal is detected.

CHART 4

| Window Combination | Data Accumulation |
| --- | --- |
| 1, 2, 7, 8, 13 and 14 | 2 |
| 2, 3, 8, 9, 14 and 15 | 1 |
| 3, 4, 9, 10, 15 and 16 | 3 |
| 4, 5, 10, 11, 16 and 17 | 12 |
| 5, 6, 11, 12, 17 and 18 | 11 |

The following chart 5 illustrates the double frequency detection for the data input of FIG. 10, and shows that even though the signal is distorted, a false double frequency tone is not detected.

CHART 5

| Window Combination | Data Accumulation |
|---|---|
| 1, 2, 9 and 10 | 4 |
| 2, 3, 10 and 11 | 3 |
| 3, 4, 12 and 13 | 2 |
| 4, 5, 13 and 14 | 5 |

There being no combination producing an accumulation of eleven bits or more, a double frequency is not detected. The following two charts illustrate the non-detection of a double frequency (chart 6) and the non-detection of a triple frequency (chart 7) from the data input which is illustrated in FIG. 11.

CHART 6

| Window Combination | Data Accumulation |
|---|---|
| 1, 2, 9 and 10 | 2 |
| 2, 3, 10 and 11 | 1 |
| 3, 4, 12 and 13 | 1 |
| 4, 5, 13 and 14 | 2 |
| 5, 6, 14 and 15 | 2 |
| 6, 7, 15 and 16 | 2 |
| 7, 8, 16 and 17 | 2 |
| 8, 9, 17 and 18 | 2 |
| 9, 10, 18 and 1 | 2 |

CHART 7

| Window Combination | Data Accumulation |
|---|---|
| 1, 2, 7, 8, 13 and 14 | 6 |
| 2, 3, 8, 9, 14 and 15 | 5 |
| 3, 4, 9, 10, 15 and 16 | 5 |
| 4, 5, 10, 11, 16 and 17 | 5 |
| 5, 6, 11, 12, 17 and 18 | 6 |

To avoid false detection of a subharmonic tone, a timer may be checked after the 16 bits have been checked to verify that the proper frequency range was received.

The data analysis which has been described above has been illustrated with double frequencies and triple frequencies both for ease of illustration of the concept and because these are the multiples which are utilized in the preferred embodiment. Other multiple frequencies could be utilized and still fall within the spirit of the present invention. For simplification of the analysis in the data analyzer 30, it is desirable that the multiples of the multiples frequencies sensed are primal with respect to each other and are divisible into the number of windows which are sequenced. Also, it should be noted that the above described embodiment could be adopted to include the detection of more than two frequencies for a single bit of information. Where more than two frequencies are used for a single bit, the information contained in a bit depends upon the number of frequencies in the set. For instance, an embodiment using three frequencies could be based upon trinary logic, and an embodiment with eight frequency sets could utilize an octal system. The base period should be an integer fraction times the frequency to be sensed, more preferably an integer times the frequency to be sensed. It is preferred that the sequencing through the windows be at a regular rate, although syncopated or other methods may alternatively be used.

By detecting both a logic high frequency and a logic low frequency simultaneously, the load controllers of the present invention can receive digital messages without the need of synchronous timing for the reception of the data bits. After a sensed-for window input sequencer 25 immediately starts collecting data for the reception of the next bit in the message. In order that the continuation of the just detected tone does not cause incorrect detection of a false bit of information, different base frequencies for the window input sequencer 25 are used for any two consecutive bits of information to be received, and thus different tone pairs are detected for consecutive bits. Different base frequencies are selected by altering the base period of time over which window input sequencer 25 sequences the 18 windows. Alternatively, the number of windows sequenced could be altered. It should also be noted that the X and Y multiples could be changed over consecutive bits to achieve sensitivity of different tone pairs. To aid in ensuring the detection of a sensed-for tone, in the preferred embodiment the tones are transmitted for a period of time which is at least twice as long as the period of time which it takes for the transmitted tone to trigger crossover detector 16 times. The length of transmission of each tone input in the preferred embodiment is 47 milleseconds.

In the preferred embodiment three sets of tone pairs are utilized. The first set of tone pairs provides for the detection of an initializer bit. The remaining two frequencies alternate for the remaining bits of a message. The following chart 8 illustrates the window input sequencer base frequencies and the sensed frequencies which are used for a ten bit message.

CHART 8

| Bit | Window Input Sequencer Frequency (Hz) | Double Frequency (Hz) | Triple Frequency (Hz) |
|---|---|---|---|
| 1 | 414.30 | 828.60 | 1242.90 |
| 2 4 6 8 10 | 382.43 | 764.86 | 1147.29 |
| 3 5 7 9 | 355.11 | 710.22 | 1065.34 |

One restriction in the preferred embodiment is that the sensed tones be in the range of 400 to 1300 Hz, so that they may be easily transmitted through telephone lines without significant distortion. Other embodiments of the present invention need not comply with this restriction, depending upon the particular application.

The particular frequencies which are used were determined to some extent by the base internal clock mechanism of the preferred embodiment which is a crystal which operates at 3,579,545 Hz. This is a commonly used crystal and is readily available at a relatively inexpensive price. The frequency of this crystal is prescaled to achieve the time duration of each of the windows in the data accumulator 29 by so prescaling, and by selecting the number of windows which are used, the window input sequencer 25 can select its base frequency.

Figure 12:
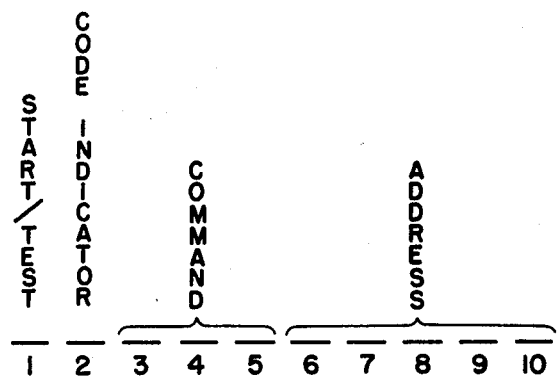
FIG. 12 illustrates the command/address code format utilized in the preferred embodiment of the present invention.

There are two message formats which are both used in the preferred embodiment. A first format shall be referred to as a command/address code set and consists of a ten bit binary message. This format is illustrated in FIG. 12. The first bit is start/test bit. The reception of a logic low for bit 1 starts the message reception sequence. The reception of a logic high for bit 1 initializes a test routine. The second bit is a code indicator bit, and indicates that the remaining bits of the message transmitted will be either in the command/address format or in the zone code format. Bits 3 through 5 indicate a command. Bits 6 through 10 indicate a specific address.

Figure 13:
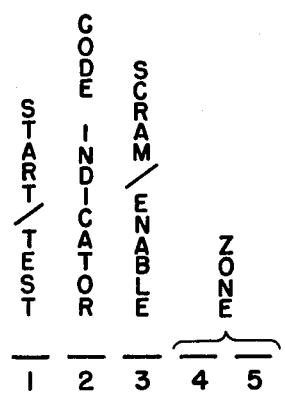
FIG. 13 illustrates the zone code format which is also utilized in the preferred embodiment.

The second message format shall be referred to as a zone code format, and is illustrated in FIG. 13. Bits 1 and 2 of the zone code format are the same as bits 1 and 2 of the command/address format. Bit 3 of the zone code format is a scram/enable and disable bit. This bit indictes whether a scram message is being sent or whether the zone code message transmitted is for the purpose of enabling the load controllers of a particular zone to be receptive to subsequential command/address messages. Bits 4 and 5 of the zone code format identify one of up to sixty-three zones. In the preferred embodiment of the present invention, a sixty-four zone code is transmittable in two bits by preprogramming the load controllers for the sequential reception of one of eight frequencies for two sequential bits. The transmission from central measage generator unit 11 transmits up to sixty-four combinations over for the two bits by transmitting one of eight frequencies each bit. Therefore effectively an octal format is achieved, however the individual controllers need only be sensitive to one frequency for a bit, therefore the reception is binary. The eight frequencies which are used by message generator unit 11 are shown in chart 9.

CHART 9

Two Tone Sequential Frequencies (Hz)

721.68
745.74
799.00
860.47
894.88
932.17
972.70
1016.72

Figure 14:
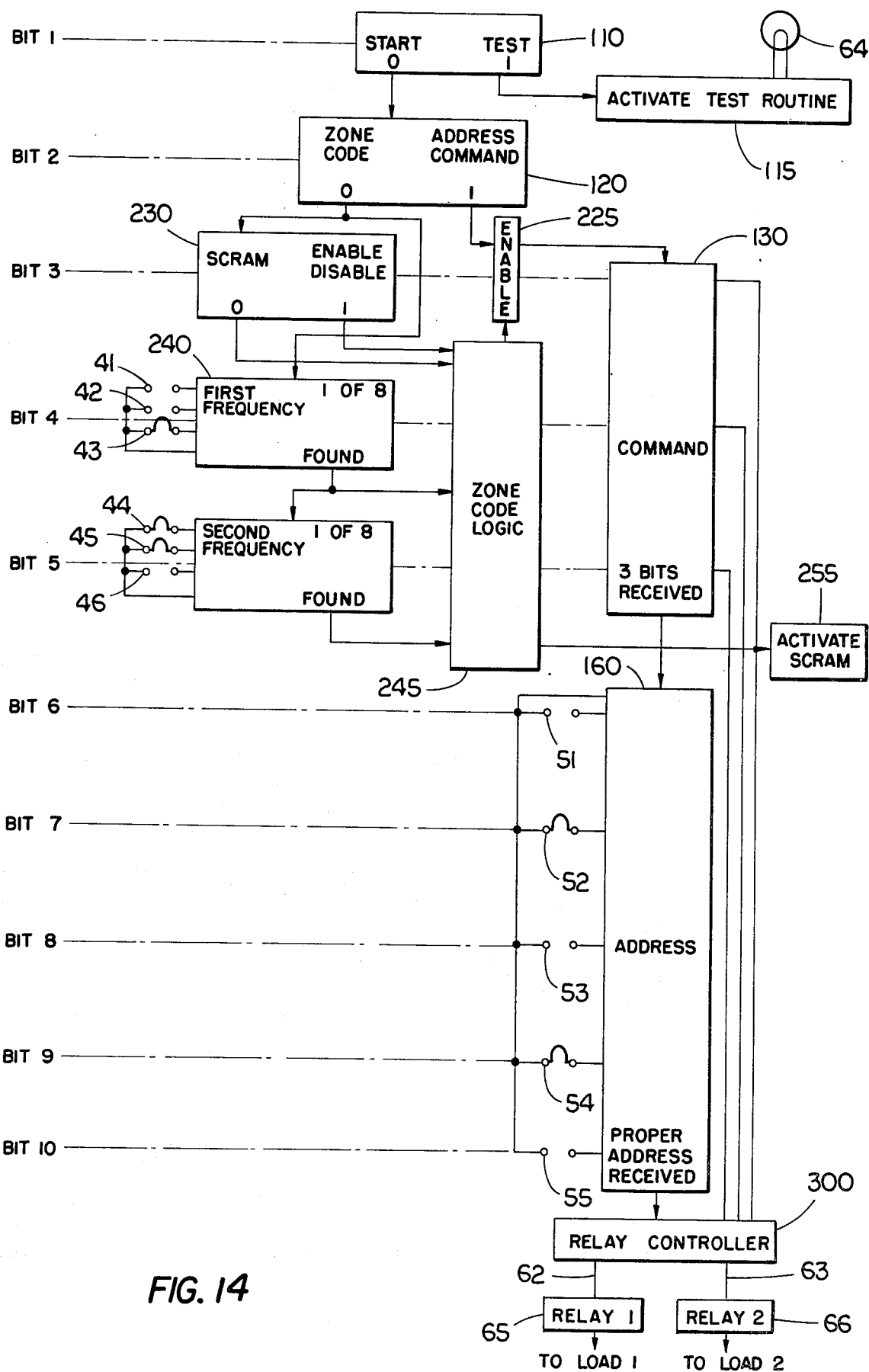
FIG. 14 is schematical illustration of the digital controller 40 of FIG. 3 with relays 65 and 66 and test light 64.
Figure 15:
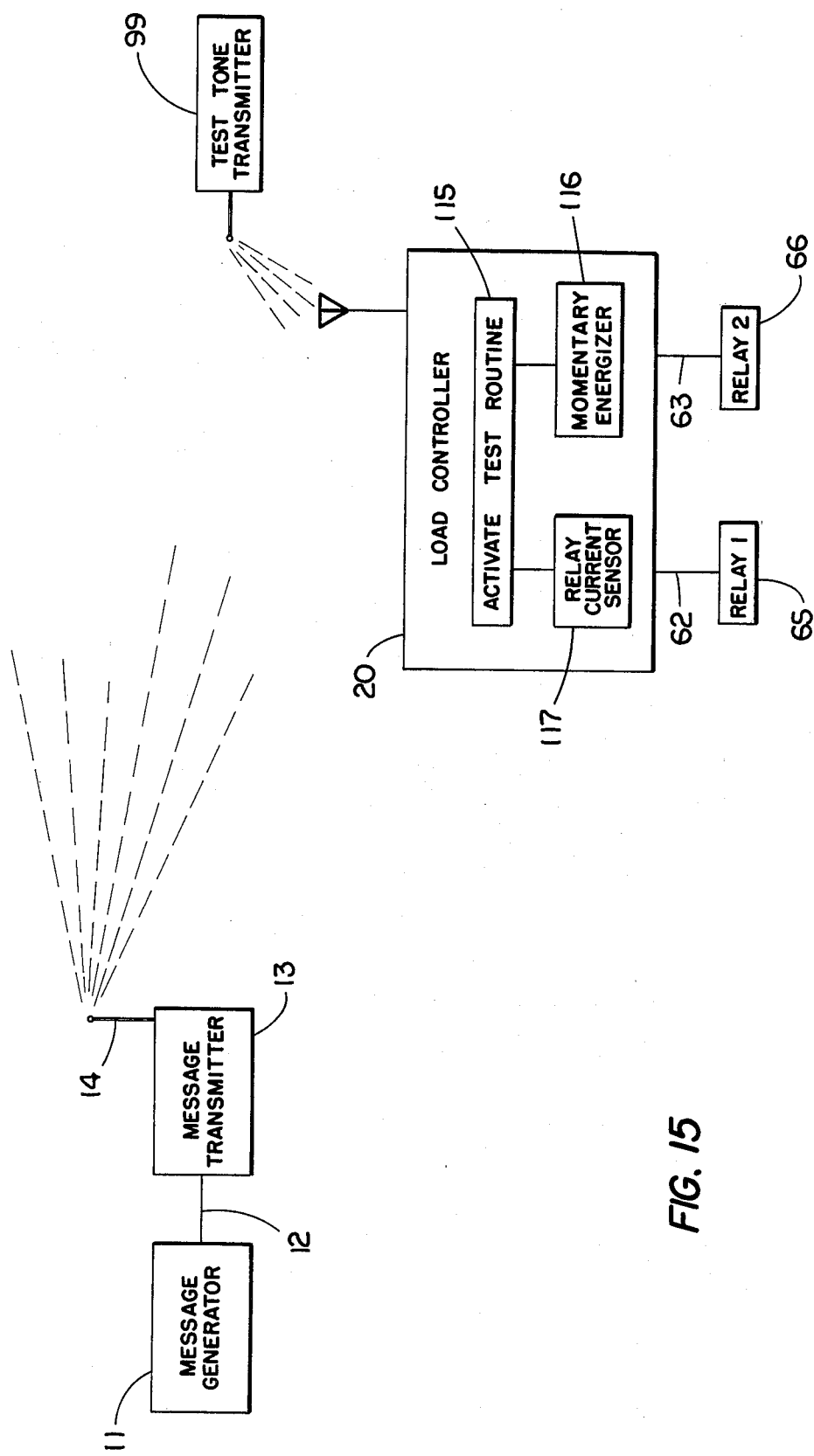
FIG. 15 illustrates the load controller 20 of FIG. 3 with relays 65 and 66, and with portable test transmitter 99 transmitting a test tone in proximity to the load controller. Also shown in FIG. 15 is the message generator 11 and message transmitter 13 of FIG. 1.

FIG. 14 is a schematic illustration of the message decoding which is accomplished by digital controller 40, and also illustrates relays 65 and 66, and test light 64. Bits 1 through 10 are generally illustrated in a time sequence from the top to the bottom of the figure.

Bit 1 indicates either that a test routine is being requested or acts as an initializer (box 110). If a test is indicated, then test routine is activated (box 115) in which the relay activation circuits are tested and, if found to be functioning properly, test light 64 is turned on to indicate that the unit is in working order.

For the zone identification portion of the message, load controller 20 is preprogrammed to be sensitive to two sequential frequencies selected from the above eight, depending upon the combination of jumper wires 41 through 46 which are connected on the unit. Sixteen iuputs are used, as is the case for the other bits, however only eight windows are sequenced, and the load controller is sensitive to only one frequency for each bit. If the first bit is a message initializer, then bit 2 is analyzed for code identification (box 120). If a command/address code format is indicated (FIG. 13) then the subsequent transmitted command (box 130) and address (box 160) are analyzed and responded to. However, this is only performed if the digital controller 40 has been previously been enabled to receive and respond to command-/address messages (box 225). When a command has been given and an appropriate address identification transmitted, then relays 65 and 66 are selectively controlled by relay controller 300. In one embodiment of the present invention, the command signals available are:

CHART 10

| Three Bit Signal | Command |
|---|---|
| 000 | Activate relay 1 with time out of 7.5 Min. |
| 001 | Activate relay 1 with time out of 15 Min. |
| 010 | Activate relay 2 with time out of 7.5 Min. |
| 011 | Activate relay 2 with time out of 15 Min. |
| 100 | Restore load on relay 1 |
| 101 | Restore load on relay 2 |
| 110 | Activate both relays with time out of 7.5 Min. |
| 111 | Activate both relays with time out of 15 Min. |

When a zone code transmission is indicated (box 120) bit 3 is analyzed to determine whether the message transmission is a scram transmission or an enable/disable transmission (box 230). Bits 4 and 5 are then analyzed (boxes 240 and 250) to determine whether the zone code transmitted matches the preprogrammed zone identifier of load controller 20 (jumpers 41 through 46). If the proper signals have been received and decoded (box 245) then subsequent address commands are enabled (box 225). If a scram indication has been sent (box 230) and proper zone identification signals decoded (box 245), then load controller 20 (of FIG. 3) activates relays 65 and 66 to remove its loads from the power system (box) 255. Whenever an inappropriate message is sent, then the further response to address commands are disabled (box 225) until a zone code message is later sent which sucessfully identifies the zone identifier of the load controller 20.

As has been previously stated, the first tone pair is utilized to either initialize a message transmission or to initialize a test routine sequence. To initialize a test routine sequence in the preferred embodiment, a portable, low power (less than 1 watt) test tone transmitter 99 is used. Such a transmitter can be easily carried by power company personnel while taking meter readings, and used to test the operation of the load controllers at their remote locations.

The reception of a test tone by load controller 20 activates a test routine (box 115). Such a test routine checks the operability of the relays in an unenergized state without causing the relay output controls to change state by momentarily energizing the relays (box 116) and by simultaneously sensing the relay current (box 117). When the relays are found to be in working order, test light 64, a light emitting diode, is lit.

Suitable apparatus for use of the invention may include an F-8 microprocessor, such as 3870 manufactured by Mostek.

While there have been described above the principles of this invention in connection with specific apparatus and techniques, it is to be clearly understood that this description is made only by way of an example and not as a limitation to the scope of the invention. As an example, with certain definitions set forth in claims, a paging system incorporating the principles of this invention could be within the scope of the invention.

What is claimed is:

1. A load management system for a power network, the power network including a power generating source and a plurality of separately controllable loads, said load management system comprising:
   a. central message generator means for transmitting coded radio frequency messages, said messages including a plurality of bits, for each bit there being at least a pair of tones with the upper tone of said pair indicating a first logic state and the lower tone of said pair indicating a second logic state, said messages including a load address indication and a command indication; and b. a plurality of load controllers, said load controllers being responsive to messages transmitted by said central message generator means, each of said load controllers being responsive to a specific load address indication, each of said load controllers including means for connecting and disconnecting a load to and from the power generating source in response to command indications from said central message generator means; each of said load controllers further including decoder means for translating said radio frequency messages into digital information, said decoder means including:

(1) input means for detecting a particular phase in the cycle of a tone;

(2) several window registers, each for accumulating single bit data applied to its input;

(3) sequencing means for repetitively and sequentially applying the output of said input means to the inputs of a number N of said window registers, said sequencing means including means for sequencing N window registers in a base period of time which is an integer X times the period of said upper tone and an integer Y times the period of said lower tone;

(4) means for detecting repetition in the pattern of data in said N window registers and for generating a first logic signal where there is repetition in each N/$X^{th}$ window register, and for generating a second logic signal where there is repetition in each N/$Y^{th}$ window register.

2. The load management system of claim 1 in which said central message generator means includes means for generating consecutive sequential bits from two different tone pairs, neither tone in the one tone pair being the same as a tone in the other and each of said load controllers includes means for responding to said two different tone pairs.

3. The load management system of claim 2 in which for each bit the base period of said sequencing means is two times the period of said lower tone and is three times the period of said upper tone.

4. The load management system of claim 3 in which said tones are between about 400 Hz and about 1,300 Hz.

5. The load management system of claim 4 in which there are three tone pairs, with one of said tone pairs being for the first bit of a message, ad the other two of said tone pairs being for the remaining bits of a message in an alternating fashion.

6. The load management system of claim 4 in which the first of the tone pairs consist of the frequencies of about 1,148 Hz and about 765 Hz, and the second of said tone pairs consist of the frequencies of about 1,065 Hz and about 710 Hz.

7. The load management system of claim 6 additionally including a third tone pair for the first bit of a message, said third tone pair consisting of the frequencies of about 829 Hz and of about 1,243 Hz.

8. The load management system of claim 2 in which the X and Y multiples of the base period of said sequencing means with respect to the periods of the upper and lower tone of each bit remain constant for sequential bits of a message.

9. The load management system of claim 8 in which each of said load controllers has a preprogrammed zone code identifier and a preprogrammed address code identifier, and in which said messages include a zone code set and a command/address code set, said zone code set including a zone identification, and said command/address code set including a load command indication and an address indication.

10. The load management system of claim 9 in which said messages include code identifier bit means for identifying which of said code sets is being transmitted, and in which each of said load controllers is responsive to a command/address code message only when the last received zone code message has identified the preprogrammed zone identifier of that load controller and the command/address code message indicates the address identifier of that load controller.

11. The load management system of claim 10 in which said zone code set includes scram indicator bit means for indicating a scram instruction, and in which all of said load controllers with a common zone identifier are responsive to a scram instruction for that zone, said response including the disconnection of said load controller's loads from the power generating source.

12. The load management system of claim 11 in which said central message generator means includes means for transmitting one of about eight tones for each zone identification bit, and in which each said load controllers includes means for detecting only one of said tones for each zone identification bit.

13. The load management system of claim 12 in which all of said tones are between about 400 Hz and about 1,300 Hz.

14. The load management system of claim 13 in which for each bit the base period of said sequencing means is two times the period of the lower tone and three times the period of the upper tone.

15. The load management system of claim 13 in which said central message generator means includes means for generating consecutive sequential bits from two different tone pairs, neither tone in the one tone pair being the same as a tone in the other and each of said load controllers includes means for responding to said two different tone pairs.

16. The load management system of claim 15 in which the first of the tone pairs consist of the frequencies of about 1,148 Hz and about 765 Hz, and the second of said tone pairs consist of the frequencies of about 1,065 Hz and about 710 Hz.

17. The load management system of claim 16 additionally including a third tone pair for the first bit of a message, said third tone pair including the frequencies of about 1,243 Hz and about 829 Hz.

18. The load management system of claim 16 in which said zone identification tones include the frequencies of about 1,017 Hz, about 973 Hz, about 932 Hz, about 895 Hz, about 860 Hz, about 799 Hz, about 746 Hz, and about 722 Hz.

19. The load management system of claim 2 in which there are three tone pairs, with one of said tone pairs being for the first bit of a message, and the other two of said tone pairs being for the remaining bits of a message in an alternating fashion.

20. The load management system of claim 19 in which each of said load controllers includes means for resetting to detect one of the first pair of tones if a bit in a message is not received within a predetermined period of time.

21. The load management system of claim 1 in which said means for detecting generates one of said logic signals if the total repetition in the respective window registers is about 65% of the theoretical value.

22. The load management system of claim 21 in which said means for detecting generates one of said logic signals only if the total repetition in the respective window registers is at least about 65% of the theoretical value.

23. The load management system of claim 1 in which said means for detecting includes means for adding pairs of adjacent window registers in detecting repetition in the pattern of window registers.

24. The load management system of claim 1 in which said input means includes a zero crossover detector.

25. The load management system of claim 1 which additionally includes means for counting the outputs of said input means and activating said means for detecting after a predetermined count.

26. The load management system of claim 25 in which said message generator means produces each tone for a period of time which is at least twice as long as the time which it takes for that tone to be detected by said input means the predetermined count number of times.

27. The load management system of claim 25 in which said predetermined count is about 16 for sequential bits.

28. A load management system for a power network, the power network including a power generating source and a plurality of separately controllable loads, said load management system comprising:
a. central message generator means for transmitting coded messages, said messages including a plurality of bits, for each bit there being a first logic state and a second logic state;
b. a plurality of load controllers, said load controllers being responsive to messages transmitted by said central message generator means, each of said load controllers including means for connecting and disconnecting a load to and from the power generating source in response to command indications from said central message generator means;
c. each of said load controllers having a preprogrammed zone code identifier and a preprogrammed address code identifier;
d. said messages including a zone code set and a command/address code set, said zone code set including means for identifying a zone; said command/address code set including means for indicating a command and means for identifying an address indication;
e. each of said load controllers including means for causing said load controller to be responsive to said command/address code set only when the last received zone code message has identified the preprogrammed zone identifier of the load controller and the command/address message indicates the address identifier of the load controller; and
f. said zone code set including scram indicator bit means for indicating a scram instruction, all of said load controllers with a common zone identifier being responsive to a scram instruction for that zone, said response including the disconnection of said load controller's loads from the power generating source.

29. The load management system of claim 28 in which said means for identifying a zone includes means for sequentially selecting one from at least about 8 tones and said means for identifying an address includes means for alternately selecting tones from between two different pairs of tones.

30. A load management system for a power network, the power network including a power generating source and a plurality of separately controllable loads, said load management system comprising:
a. central message generator means for transmitting coded radio frequency messages, said messages including a plurality of bits, for each bit there being a pair of tones with the upper tone indicating a first logic state and the lower tone indicating a second logic state, said messages including a load address indication and a command indication;
b. said central message generator means including means:
(1) for beginning each message with a tone from a first tone pair, the tone selected from said first tone pair being used only as the first bit in a message and not used as a subsequent bit in a message and
(2) for conveying further portions of messages with tones for sequential bits being selected alternately between a second and a third tone pair, all of the tones in said first, second and third tone pairs being different from each other.
c. a plurality of load controllers, said load controllers being responsive to messages transmitted by said central message generator means, each of said load controllers being responsive to a specific load address indication, each of said load controllers including means for connecting and disconnecting a load to and from the power generating source in response to command indications from said central message generator means;
d. decoder means in said load controllers for translating said radio frequency messages into digital information;
e. alternating means in said decoder means for permitting alternate sensitivity for tone detection from said first, second and third tone pairs, said alternating means preventing sensitivity to tones in any one of said tone pairs when detecting a tone from another of said tone pairs and for permitting sensitivity to either tone of a tone pair when sensitivity for tone detection is permitted; and
f. means for causing said alternating means to become sensitive to a different tone pair in response to detection of a tone.

31. The load management system of claim 30 additionally including:
a. a test transmitter which transmits a radio frequency test signal with only a single tone, said single tone being from said first tone pair and
b. means in said load controller to energize an electrically operable indicator in response to said radio frequency test signal if portions of the means for connecting and disconnecting a load are operable.

32. The load management system of claim 31 in which said means for connecting and disconnecting includes relays and in which said means to energize includes means to determine operability of said relay in an unenergized state without causing said relay output contacts to change state.

33. The load management system of claim 31 in which said electrically operable indicator is a light emitting device.

34. A load management system for a power network, the power network including a power generating source and a plurality of separately controllable loads, said load management system comprising:
   a. central message generator means for transmitting coded messages by modulating a radio frequency, said messages including a plurality of bits, said messages including a load address indication and a command indication;
   b. said central message generator means including means for beginning each message with a specific first tone;
   c. a portable, battery powered, transmitter having a radiated power of less than 1 watt which when operated transmits a single tone modulated radio frequency signal the same radio frequency as said central message generator means, said single tone being a test tone of different frequency than said first tone;
   d. a plurality of load controllers, said load controllers being responsive to signals transmitted by said portable transmitter and to messages transmitted by said central message generator means, each of said load controllers being responsive to a specific load address indication, each of said load controllers including means for connecting and disconnecting a load to and from the power generating source in response to command indications from said central message generator means;
   e. decoder means in said load controllers for translating said transmitted coded messages into digital infomation;
   f. means for causing said decoder to be essentially simultaneously sensitive to modulation of radio frequency signals with either said first tone or said test tone whenever a radio frequency message is not being received;
   f. an electrically operable indicator;
   g. means for determining the operability of a portion of said means for connecting and disconnecting a load and for operating said electrically operable indicator when said test tone is received depending upon the result of the determining.

35. The load management system of claim 34 in which said means for connecting and disconnecting includes relays and in which said means to energize includes means to determine operability of said relay in an unenergized state without causing said relay output contacts to change state.

36. The load management system of claim 34 in which said electrically operable indicator is a light emitting device.

37. The load management system of claim 34 in which said test tone is at least about 1,243 Hz or below about 400 Hz.

38. The load management system of claim 27 in which N=18 for sequential bits.

* * * * *